United States Patent
Dixon et al.

(10) Patent No.: US 7,926,169 B1
(45) Date of Patent: Apr. 19, 2011

(54) SYSTEM AND METHOD FOR MANUFACTURING A THERMAL BATTERY

(75) Inventors: Graham Dixon, Phoenix, AZ (US); Mark Hart, Ashland, MO (US); Ola Pettersson, Huntsville, AL (US); Chad Sneath, Gilbert, AZ (US)

(73) Assignee: EaglePicher Technologies, LLC, Joplin, MO (US)

( * ) Notice: Subject to any disclaimer, the term of this patent is extended or adjusted under 35 U.S.C. 154(b) by 0 days.

(21) Appl. No.: 12/965,081

(22) Filed: Dec. 10, 2010

Related U.S. Application Data

(63) Continuation of application No. 11/670,856, filed on Feb. 2, 2007, now Pat. No. 7,871,447.

(60) Provisional application No. 60/743,229, filed on Feb. 3, 2006.

(51) Int. Cl.
*B23P 19/00* (2006.01)
*H01M 6/36* (2006.01)

(52) U.S. Cl. .......................... 29/730; 29/623.1; 429/112

(58) Field of Classification Search .................. 429/112; 29/623.1, 730; 219/124.1; 53/501; 376/261; 250/559.06; 428/402
See application file for complete search history.

(56) References Cited

U.S. PATENT DOCUMENTS

| | | | | |
|---|---|---|---|---|
| 1,512,788 | A | * | 10/1924 | Morton ...................... 219/124.1 |
| 3,871,156 | A | * | 3/1975 | Koenig et al. ................... 53/501 |
| 3,918,487 | A | | 11/1975 | Smithson |
| 4,687,605 | A | | 8/1987 | Cellier et al. |
| 4,817,517 | A | | 4/1989 | Ammann et al. |
| 4,980,119 | A | * | 12/1990 | Schoenig et al. ............. 376/261 |
| H001397 | H | | 1/1995 | Plichta et al. |
| 5,652,432 | A | * | 7/1997 | Yaginuma ................ 250/559.06 |
| 2003/0207112 | A1 | * | 11/2003 | Yadav ........................... 428/402 |
| 2005/0014064 | A1 | | 1/2005 | Matsubara |
| 2005/0230872 | A1 | | 10/2005 | Scobee et al. |

FOREIGN PATENT DOCUMENTS

| | | | |
|---|---|---|---|
| FR | 2297094 A | * | 10/1976 |
| SU | 890157 B | * | 12/1981 |

OTHER PUBLICATIONS

English Translation of: FR 2,297,094 A, Lillers, Oct. 1976.*
English Abstract of: SU 890,157 B, Nefedov et al., Dec. 1981.*
Dec. 10, 2010 Office Action issued in U.S. Appl. No. 11/670,890.
Apr. 19, 2010 Office Action issued in U.S. Appl. No. 11/670,901.
Aug. 6, 2010 Office Action issued in U.S. Appl. No. 11/670,901.
Jan. 27, 2010 Office Action issued in U.S. Appl. No. 11/670,856.
Nov. 18, 2010 Notice of Allowance issued in U.S. Appl. No. 11/670,901.
Jan. 12, 2011 Office Action issued in U.S. Appl. No. 12/969,002.
May 25, 2010 Notice of Allowance issued in U.S. Appl. No. 11/670,856.
Sep. 8, 2010 Notice of Allowance issued in U.S. Appl. No. 11/670,856.

* cited by examiner

*Primary Examiner* — Jonathan Crepeau
*Assistant Examiner* — Kenneth Douyette
(74) *Attorney, Agent, or Firm* — Oliff & Berridge, PLC

(57) ABSTRACT

An automated system and method for manufacturing a thermal battery is disclosed. In an exemplary embodiment, the system comprises a press system, a stacking system, and an enclosing system to automate the manufacturing process of thermal batteries. A method of manufacturing a thermal battery using the system is also disclosed. An automated tracking, storage, and retrieval system for pellets used in the manufacturing process and a pellet pairing system are also disclosed.

11 Claims, 9 Drawing Sheets

SYSTEM AND METHOD FOR MANUFACTURING A THERMAL BATTERY

CROSS-REFERENCE TO RELATED APPLICATION

This application is a continuation of and claims priority to U.S. Ser. No. 11/670,856 entitled "SYSTEM AND METHOD FOR MANUFACTURING A THERMAL BATTERY" filed Feb. 2, 2007 now U.S. Pat. No. 7,871,447. The U.S. Ser. No. 11/670,856 application claims priority to U.S. Provisional Patent Application No. 60/743,229 entitled "SYSTEM AND METHOD FOR MANUFACTURING A THERMAL BATTERY" filed Feb. 3, 2006. These prior applications are incorporated by reference in their entirety.

FIELD OF INVENTION

The present invention generally relates to thermal batteries, and more particularly, to automated thermal battery manufacturing systems and methods.

BACKGROUND OF THE INVENTION

Thermal batteries are primary reserve batteries that utilize an electrolyte that, at ambient temperatures, is a nonconductive solid. Thermal batteries are characterized as providing a large amount of energy relative to their volume. These batteries, if hermetically sealed, can be stored for a long period of time (in many instances greater than ten years) without substantial degradation of performance, and can perform without preliminary preparation in many different environments. Thus, thermal batteries are a desirable source of power in a number of different applications. Once activated, a thermal battery supplies electric power to a device for time periods ranging from a few seconds to an hour or longer. No maintenance is required for a thermal battery during storage prior to use, which permits it to be permanently installed in devices that themselves may experience long periods of storage before use. For example, thermal batteries are used in missile systems such as Joint Direct Attack Munition (JDAM), Stinger, Javelin, BAT smart missiles, as well as other systems such as aircraft ejector seats, and sonar buoys.

The configuration of a thermal battery is dictated by mechanical and thermodynamic considerations and is typically a right circular cylinder known as a "cell stack." Mechanically, since the components are rigid and brittle, the stack is sealed under mechanical pressure for dynamic environment considerations such as shock, vibration, and acceleration.

Thermal batteries contain materials that generally are inert and non-conductive until the battery is activated. Upon activation, the materials become molten and highly conductive. This allows the cathode to interact with the anode. The thermal battery materials are activated by igniting the battery. For example, a mixture of iron powder and potassium perchlorate preferably is used to ignite a battery. Once activated, the battery may continue to perform until the active material is exhausted or until the battery cools below the melting point of the electrolyte.

The typical thermal battery has been constructed using manual techniques. The conventional wisdom has been that many of the tasks could not be performed adequately via automation and machine. However, human error and variability may also result from manual manufacturing techniques. Furthermore, manual processing is typically slow. Moreover, there exists a need for improved testing methods. Thus, additional systems, methods, and devices are needed to facilitate the manufacture of thermal batteries.

SUMMARY OF THE INVENTION

In accordance with various aspects and embodiments of the present invention, an automated system for producing thermal batteries comprises (i) a press system having a rail and shoe system, which is adapted to form pellets from a powder material, (ii) a stacking system associated with the press system, which stacking system is configured to select pellets from storage containers and stack the pellets in a predetermined order, and (iii) an enclosing system associated with the stacking system, which enclosing system is configured to hermetically enclose the stacked pellets. In accordance with one aspect of an exemplary embodiment, the press system includes an automated servo press system adapted to receive a powder material, lay down one or more layers of the powder material, and press the layer(s) of powder material into a pellet (such as, for example, an anode or cathode pellet).

In accordance with another aspect of an exemplary embodiment of the invention, the storage containers utilized in connection with the stacking system are pucks, and the press system is configured to sort pellets into more than two pucks such that each puck contains pellets that are similar in material, weight, density, and/or thickness.

In accordance with another aspect of an exemplary embodiment of the invention, the stacking system is configured to select appropriate pellets from the storage containers for forming a thermal battery and to stack the selected pellets on a stacking fixture, wherein the stacking system selects pellets based on weight, thickness, material, and/or density. In accordance with an exemplary embodiment, the press system and stacking system utilize a positive air pressure pellet carrier device configured to use the Bernoulli principle to lift and transport pellets.

In accordance with yet another aspect of an exemplary embodiment, the enclosing system is configured to laser weld a seam between a thermal battery container (e.g., a metal cylinder or "can") and a thermal battery cap when the container and cap are pressed together.

In accordance with another exemplary embodiment, the automated system may include an inventory system designed to track, store, and retrieve pellets according to user specifications.

In accordance with another exemplary embodiment, a method of manufacturing a thermal battery includes the steps of pressing pellets with an automated pellet press, stacking the pellets in a predetermined order using a positive air pressure pellet carrier device, and enclosing the stacked pellets to form a thermal battery.

In accordance with another exemplary embodiment of the invention, a method for pairing pellets in a thermal battery assembly includes the steps of (i) sorting a plurality of pellets into at least a first group and a second group, wherein the first group comprises pellets having at least one of a first weight range, a first thickness range, and a first density range, and wherein the second group comprises pellets having at least one of a second weight range, a second thickness range, and a second density range; wherein the first weight range is a different range than the second weight range, the first thickness range is a different range than the second thickness range, and the first density range is a different range than the second density range, and wherein the pellets of the first group and the second group comprise substantially the same material; (ii) selecting at least a first pellet from the first group; (iii) selecting at least a second pellet from the second group; and (iv) assembling a thermal battery comprising the first pellet and the second pellet, wherein the first pellet and the second pellet are selected relative to each other such that at least one of an average weight, an average thickness, and an average density of the thermal battery is within a desired average range.

In accordance with still another exemplary embodiment of the invention, a system for producing a thermal battery includes (i) a press system configured to form pellets from a powder material, wherein the press system is configured to sort pellets into at least two groups, wherein each group comprises pellets of substantially the same material and comprises pellets that substantially share at least one of the following material characteristics: weight, density, and thickness; (ii) a stacking system associated with the press system, the stacking system configured to select pellets from the at least two groups and to stack the selected pellets in a predetermined order, wherein the pellets are selected from the at least two groups relative to each other such that at least one of an average weight, an average thickness, and an average density of the thermal battery is within a desired average range; and, (iii) an enclosing system associated with the stacking system, wherein the enclosing system is configured to enclose the stacked pellets within a container, and wherein at least one of the press system, the stacking system, and the enclosing system is substantially automated.

In accordance with still another exemplary embodiment, a system to track, store, and/or retrieve thermal battery components comprises (i) a plurality of storage containers configured to hold a plurality of pellets, wherein each storage container is associated with a unique identifier, and wherein each unique identifier is associated with information describing characteristics of one or more thermal battery pellets stored in the storage container; (ii) a unique identifier reading device comprising circuitry to read the unique identifier; and (iii) a tracking device configured to track a plurality of thermal battery pellets as the thermal battery pellets are manufactured, wherein the tracking device is configured to associate the location of the pellets with the unique identifier.

BRIEF DESCRIPTION OF THE DRAWING FIGURES

A more complete understanding of the present invention may be derived by referring to the detailed description and claims when considered in connection with the drawing Figures, wherein like reference numbers refer to similar elements throughout the drawing Figures, and:

DETAILED DESCRIPTION

While the exemplary embodiments herein are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation.

In accordance with various exemplary embodiments of the invention, a thermal battery manufacturing system and method are configured to facilitate the automated manufacture of thermal batteries. Furthermore, the thermal battery manufacturing system is configured to facilitate testing of thermal batteries, storage of thermal battery components, transportation of thermal battery components, pairing of pellets, and/or improving hermeticity. Moreover, the systems and methods may facilitate production of high quality thermal batteries facilitate an increase in the quantity of thermal batteries produced and/or the efficiency of making such batteries. Furthermore, the cost of making thermal batteries may be reduced through use of the systems and methods described herein.

Figure 2:
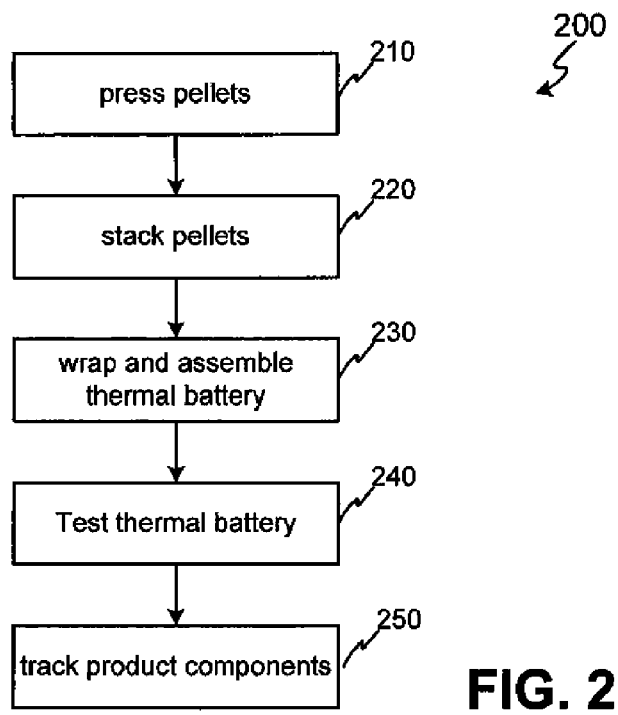
FIG. 2 is a flow diagram showing an exemplary thermal battery manufacturing method.

In one exemplary embodiment of the present invention, and with reference to FIG. 2, an exemplary thermal battery manufacturing method 200 comprises the steps of: pressing powder into pellets (step 210), stacking pellets (step 220), enclosing the stacked pellets to complete a thermal battery (step 230), testing the thermal battery (step 240), and/or tracking components and related data (step 250).

Figure 1:
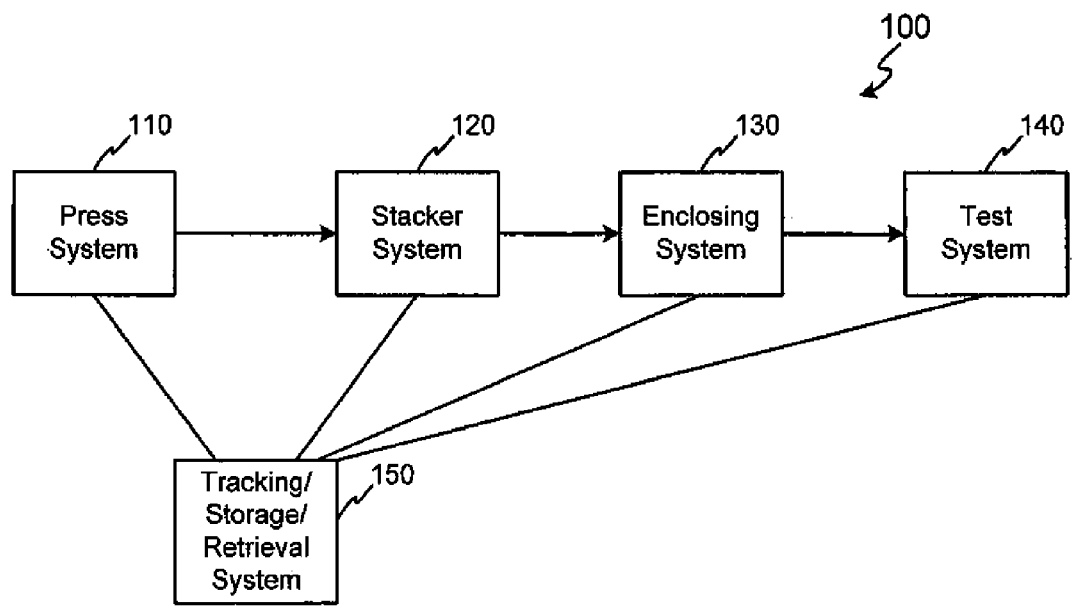
FIG. 1 is a block diagram overview of an exemplary thermal battery manufacturing system.

In accordance with one aspect of an exemplary embodiment of the present invention, the thermal battery manufacturing system comprises a press system, a stacking system, an enclosing system, a test system and/or a tracking/storage/retrieval system. With reference to FIG. 1, an exemplary thermal battery manufacturing system 100 comprises a press system 110, a stacking system 120, an enclosing system 130, a test system 140 and/or a tracking/storage/retrieval system 150. Tracking/storage/retrieval system 150 may, for example comprise an automated storage and retrieval system ("ASRS").

In accordance with one aspect of an exemplary embodiment of the present invention, press system 110 is configured to be placed to press powder to create pellets (step 210). The pellets preferably are configured to be placed within a thermal battery. Although the pellet is described herein as a flat, round and thin pellet, it should be appreciated that the pellet may be formed into any one of various shapes. In accordance with another aspect of an exemplary embodiment of the present invention, pressing the powder material (step 210) further includes the steps of: pouring the powder material, stamping the powder material into a thin pellet, verifying the quality of the pellet, and/or loading the pellet into a carrier (referred to herein as a "puck").

Figure 3:
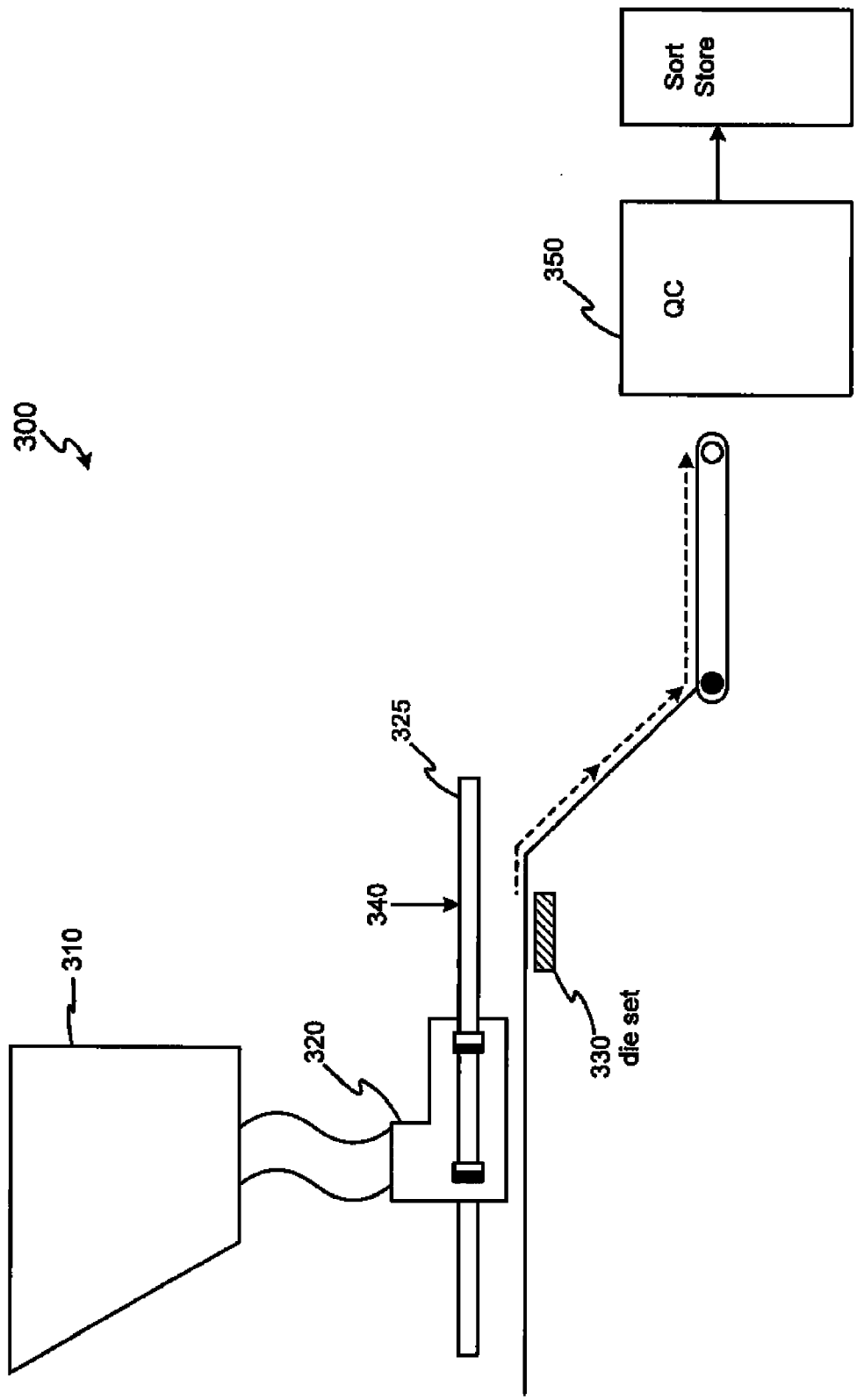
FIG. 3 is a block diagram of an exemplary stacker device.

With reference now to FIG. 3, a press system 110 may comprise any components that are configured to receive a powder material, to lay down a layer of the powder material and to press the layers of powder material into a pellet. In accordance with various aspects of an exemplary embodiment, press system 300 is configured to form pellets by pressing the powder material into a pellet having a substantially consistent size, weight, density, thickness, and/or the like. Press system 300 preferably is further configured to produce pellets quickly and with a high likelihood of meeting quality control criteria. In accordance with one aspect of an exemplary embodiment, creating pellets of a consistent density, weight and thickness may facilitate reducing hot spots in the thermal battery. Stated otherwise, pellets having consistent material properties (such as weight, density, thickness, and the like) tend to facilitate assembling a thermal battery having an even distribution of material throughout the battery, and thus an even temperature distribution when the battery is fired.

In accordance with an exemplary embodiment, and with continued reference to FIG. 3, press system 300 comprises a hopper 310, a "shoe" 320, a die set 330, a rail system 325, and/or punch tooling 340. Hopper 310 preferably is configured to receive a powder material. For example, powder material preferably is fed into hopper 310 from bags, jars, and/or other similar containers. Hopper 310 preferably is also configured to supply powder shoe 320 with the powder material.

In accordance with one aspect of an exemplary embodiment of the present invention, shoe 320 is configured to receive the powder material and to dispense a quantity of powder into punch tooling 340. In accordance with another aspect of an exemplary embodiment, shoe 320 is configured to slide forward and backward on rail system 325. The shoe may, for example supply a layer of powder as it moves forward across die set 330, and even out the layer of powder as it moves backwards on rail system 325. Shoe 320 may also be configured to move forward and backwards or side to side multiple times, creating a "shake," to further even out the layer of powder. Furthermore, press system 300 preferably comprises devices that are configured to perform 'tapping,' 'shaking,' or 'vibration,' to further even out the layer of powder. In accordance with yet another aspect of an exemplary embodiment of the present invention, press system 300 is configured to push the newly created pellet from die set 330 and transport the pellet down a slide, via conveyor belt, and/or via other methods of transporting a pellet away from the die set area of press 300.

In accordance with yet another aspect of an exemplary embodiment of the present invention, press system 300 does not comprise any systems that are cantilevered or that have pivots. Furthermore, any other powder supplying systems may be used that tend to facilitate spreading a powder with a level surface, even pressure, and/or consistent powder thickness.

In accordance with one aspect of an exemplary embodiment of the present invention, punch tooling 340 is configured to press the powder into a thin pellet. Punch tooling 340 preferably facilitates consistency (i.e., tighter tolerances) in pellet thickness, density, weight, and/or the like. The press servo, in an exemplary embodiment, utilizes electronic feedback systems to control positional accuracy to a finer degree than previously available with known art. This improves press repeatability for position, which in turn reduces the tolerance of the compressed pellet thickness. Punch tooling 340 preferably is configured to subject the powder to a pressing force of, for example 20 tons to 175 tons. However, other forces may be used, and pressing forces may vary from powder to powder.

In one exemplary embodiment, punch tooling 340 comprises a top punch and a bottom punch that are preferably configured to move toward each other to press the powder material into a pellet. In an exemplary embodiment of the present invention, the press is a hydraulic press, a servo press, and/or the like. The pressing of the powder into a pellet may take place, for example, in an argon gas environment; however, nitrogen and/or other environments may be utilized.

Furthermore, any press system may be used that tends to facilitate achieving tighter tolerances, a more consistent thickness of the powder layer, and evenly pressed pellets. The ability to achieve tighter tolerances may facilitate stacking more pellets within the same height of stacked pellets. Thus, use of a servo press and/or rail driven powder shoe may tend to facilitate adding more cells to a thermal battery compared to prior art thermal battery manufacturing methods involving hydraulic presses. This results in more consistent pellet thicknesses, which allows designs with more cells to be built because prior art battery designs were size limited taking into account the possible tolerance inconsistency of the old art presses. Tighter tolerances may also permit an equal sized battery to provide more power, due to the increase number of pellets that may fit in one space. By improving tolerances by 60% it is possible to achieve 5% greater power from same sized thermal battery due to the addition of another cell in the same container size. Tighter tolerances may also facilitate manufacturing an equal powered thermal battery that is smaller in size. For example, by improving tolerances by 60%, it may be possible to produce a 1% shorter thermal battery.

The powder material may comprise any number of chemicals or compositions that are now known, or that are later discovered to be useful materials in thermal batteries. For example, the powder material may comprise substances such as lithium/aluminum and lithium/silicon (anode), and iron disulfide—$FeS_2$ (cathode). Other powder materials may comprise electrolytes, such as combinations of one or more of lithium fluoride, lithium bromide, magnesium oxide, lithium chloride, and/or the like. Another exemplary powder material is a pyrotechnic material or the like. Thus, the powder materials may comprise any substances that can be formed into pellets of the following types: anode, cathode, electrolyte, pyrotechnic, and an electrode (e.g., a stainless steel disk, 3-5 thousandths of an inch thick).

In accordance with one aspect of an exemplary embodiment, the cathode pellets may be produced from a variety of materials, such as calcium chromate ($CaCrO_4$), potassium dichromate ($K_2Cr_2O_4$), potassium chromate ($KCr_2O_2$), lead chromate ($PbCrO_4$), metal oxides such as vanadium pentoxide ($V_2O_5$) and tungsten trioxide ($WO_3$), and sulfides such as cupric sulfide ($CuS$), iron disulfide ($FeS_2$), and cobalt disulfide ($COS_2$). A preferred material is iron disulfide powder mixed with minor portions of an electrolyte salt mixture and optionally binder material such as magnesium oxide. Iron disulfide and cobalt disulfide are preferred for use with lithium-containing anodes because of chemical compatibility.

In accordance with another aspect of an exemplary embodiment, the anode pellets may be made of calcium metal or magnesium metal, but lithium metal and lithium-aluminum or lithium-silicon alloys are preferred. For example, compounds such as LiSi, LiAl, LiAlSi, and LiAlFe may be used in the anode pellets (which compounds are understood to include all alloys of Li, Al, and Si in varied proportions). As described in detail herein, the lithium-aluminum and lithium-silicon alloys are processed into powders and cold-pressed into wafers or pellets.

Pressing the powder into a pellet (step 210) may further include the steps of verifying the quality of the pellet. For example, the pellet may be manually inspected. However, manual weighing and measuring may tend to suffer from human inaccuracies, breakage due to manual handling, and slowness. Often, due to breakage and time considerations, manual inspection involves sampling measurements and attributing the results of the sample to all of the pellets. As such, tolerances tend to be larger with manual measuring than with automated methods. Furthermore, the pellets tend to be fragile and manual inspection and handling of pellets tends to increase the likelihood of breaking, chipping, or otherwise damaging the pellets. Moreover, without performing quality checks on each pellet, the odds may increase that several relatively heavier pellets are used in one part of a thermal battery, thus causing a hot spot.

In accordance with various aspects of exemplary embodiments of the present invention, the pellet quality control ("QC") system is configured to inspect the quality of the pellet in an automated manner. In accordance with another aspect, a QC device 350 is configured to automatically weigh a pellet, measure its thickness, and visually inspect the pellet. In one exemplary embodiment, QC device 350 preferably is also configured to receive pellets from the press in an automated manner, such as from a conveyor belt.

Thus, in accordance with one aspect of an exemplary embodiment of the present invention, QC device 350 is configured to automatically weigh individual pellets. In this regard, QC device 350 may comprise a digital scale, or the like. For example, a Mettler Toledo electronic weighing module may be used. Other devices may also be used to weigh individual pellets.

In accordance with another aspect of an exemplary embodiment of the present invention, QC device 350 is configured to automatically measure the diameter and/or thickness of individual pellets. In accordance with one aspect of the invention, for example, QC device 350 may include a Linear Voltage Distance Transducer ("LVDT"). Furthermore, other devices may be used to automatically measure the thickness of individual pellets. QC device 350 may further be configured to determine the pellet density. For example, based on the thickness and the weight of the pellet, QC device 350 may be configured to calculate the density of the pellet.

QC device 350 also is preferably configured to visually inspect a pellet, scan one or both sides of the pellet, determine if any significant chips, cracks, other structural flaws and/or incompleteness exist in the pellet, verify the 'roundness' of the pellet, identify any edge cracks in the pellet, and/or the like. Thus, in one exemplary embodiment of the present invention, QC device 350 also preferably includes a vision system such as a DVT LEGEND series camera. QC device 350 may also comprise, however, any other devices that are configured to automatically determine the weight, thickness, size, density, and/or structural integrity of each pellet.

In accordance with various aspects of an exemplary embodiment of the present invention, system 100 is configured to group pellets of the same type based on a material characteristic of the pellet. For example, individual cathode pellets may be grouped or classified according to their weights, thicknesses, densities, and the like. In this example, pellets that are within acceptable tolerances may nonetheless have small variations in their weight, thickness, or density.

Thus, system 100 preferably is configured to classify individual pellets as light pellets, average weight pellets, and heavy pellets. Moreover, the pellets may be classified into many different categories of pellet weights. For example, pellets may be categorized according to light and very light ranges. These categories may be defined by the weight range associated with each category. The weights applicable to each range may vary, but in one example, a pellet weighing 20.9 grams is classified as a heavy pellet and a pellet weighing 20.1 grams may be classified as a light pellet. These categories may alternatively be defined relative to each other, for example, where some categories are relatively lighter or heavier than other categories.

In one exemplary embodiment, the pellets are sorted by weight, or in other words, the pellets are sorted into groups of pellets that share the same weight range or classification. Thus, for example, QC device 350 is configured to classify pellets of the same type based on their weight and to sort those individual pellets into groups associated with their individual classification.

Similarly, system 100 preferably is configured to classify individual pellets as thin pellets, average thickness pellets, and thick pellets. Moreover, the pellets may be classified into many different categories of pellet thicknesses. For example, pellets may be categorized according to thin and very thin ranges. These categories may be defined by the thickness range associated with each category. The thickness applicable to each range may vary, but in one example, a pellet having a thickness of 12 thousandths of an inch is classified as a thin pellet and a pellet having a thickness of 30 thousandths of an inch is classified as a thick pellet. These categories may alternatively be defined relative to each other, for example, where some categories are relatively thinner or thicker than other categories.

The pellets may also be sorted by thickness, or in other words, the pellets may also be sorted into groups of pellets that share the same thickness range or classification. Thus, for example, QC device 350 is configured to classify pellets of the same type based on their thickness and to sort those individual pellets into groups associated with their individual thickness classification. Thus, groups of pellets may be created that share the same thickness characteristic (e.g., thick, average, thin). Similarly, in another exemplary embodiment, QC device 350 is configured to classify and sort individual pellets into groups associated with their individual density classifications.

Furthermore, QC device 350 preferably is configured to identify pellets that fall outside of acceptable criteria or that are outside of specified tolerances for pellet weight, thickness and/or density tolerances, based on the determined weight, thickness, and/or density. For example, a pellet weighing less than an acceptable amount or more than an acceptable amount preferably is classified as being within a rejected range. In another example, pellets that are too light, too thin, or incompletely formed preferably are identified as such. The identified pellets may further be marked, redirected, sent to a reject bin, and/or discarded. Moreover, in accordance with one aspect of the invention, the results of the tests are recorded for future analysis. For example, data with respect to characteristics such as weight, thickness, density, the presence of cracks, and/or like data, preferably are stored digitally in a database.

In accordance with various aspects of an exemplary embodiment of the present invention, system 100 and/or QC device 350 comprise a database or other system for recording information related to a pellet. QC device 350 is preferably associated with press system 110 and with stacking system 120. QC device 350, in exemplary embodiments, further comprises a robotic pellet moving device. For example, the QC system preferably includes a positive air pressure pellet moving device. However, the QC system may comprise any other pellet moving system and may also be associated with any portion of the thermal battery manufacturing system.

The ability to measure or determine the weight, thickness, and/or density of each and every pellet and to track such pellets opens the possibility of purposefully selecting pellets for placement in the thermal battery based on variations in the individual pellet's weight, thickness, and/or density. Thus, in accordance with one aspect of an exemplary embodiment of the present invention, the thermal battery manufacturing system is configured to assemble a thermal battery by selecting a pellet based not only on its material type, but also by selecting from among more than one category of pellet of its same type. For example, a cathode pellet may be selected from among two groups of cathode pellets, where one group includes pellets that are relatively heavier than the pellets in the other group.

In accordance with another aspect of an exemplary embodiment of the present invention, the QC device is not only configured to select the pellets based on their weight, thickness, and/or density characteristic, but to perform pellet pairing. Pellet pairing may include any method of combining two or more such selected pellets within a thermal battery.

With the pellets sorted into groups by weight, system 100 preferably is configured to selectively combine pellets of different weights during the stacking of the pellets to form the thermal battery. The pellets may be selected, for example, such that within a thermal battery or within a single cell, a heavy pellet is paired with a light pellet. Furthermore, if more than two weight categories are used, additional pairings or combinations of pellets may be used. Thus, pellet pairing may be configured to facilitate construction of thermal batteries having a predetermined weight and/or to maintain an even distribution of pellet material throughout a particular thermal battery or cell.

Thus, in an exemplary embodiment, pellet pairing comprises selecting pellets from groups of pellets, where at least two groups of pellets have weight characteristics that are different from each other. For example, pellet pairing comprises selecting pellets from a group of heavy pellets and pairing them with pellets selected from a group of light pellets. However, in accordance with another exemplary embodiment, pellets of different weight ranges are identified and shuffled together, such that selecting the pellets in order is likely to provide an even distribution of pellet material.

Similarly, system 100 may selectively incorporate pellets of different thicknesses into a thermal battery. The pellets may be selected, for example, such that within a thermal battery, or within a single cell, a thick pellet is paired with a thin pellet. Furthermore, depending on the thicknesses and number of thickness classifications, any number of pellets may be matched or combined in any particular order. Thus, pellet pairing preferably facilitates the manufacture of thermal batteries wherein the total thickness of each stack of pellets in the thermal battery or in a cell can be predetermined and consistently achieved in practice. Furthermore, pellets of various thicknesses may be shuffled together in a single group such that selecting the pellets in order is likely to provide an even distribution of pellet material.

In a similar manner, pellet pairing may be based upon pellet densities. Furthermore, in accordance with another aspect of an exemplary embodiment of the present invention, pellet pairing may be implemented through pairing based on a combination of the weight, thickness, and density of the individual pellets. Furthermore, in accordance with various aspects of an exemplary embodiment of the present invention, pellet pairing is configured to create a thermal battery having a predetermined weight, thickness, and/or density of that type of pellet in the thermal battery or in cells of the thermal battery. The pellet pairing may also be configured to reduce hot spots in the thermal battery. Furthermore, other methods or devices may be used that are configured to place a pellet in a thermal battery assembly based on its type and based on the individual pellet's weight, thickness, or density classification.

In accordance with one aspect of an exemplary embodiment of the present invention, a method of pellet pairing comprises determining the weight, thickness, and/or density of a pellet (step 910). The determination preferably is made by measurement, calculation, and/or the like. The determined weight, thickness, and/or density are compared to standards for that determined value (step 920). Based on this comparison, the pellet is categorized/classified (step 930). The pellet may further be physically grouped together with other pellets that share the same category/classification (step 950). For example, the pellets preferably are sorted into storage containers, with each storage container holding one category of pellet.

During assembly of a thermal battery, the pellets are retrieved for use in building the thermal battery. In accordance with one aspect, more than one group of pellets of the same type, each having a different category of pellets, is selected (step 940) and delivered to the thermal battery assembly area. In one exemplary embodiment of the present invention, a pellet is selected from a first group having a first material characteristic (step 951). If that first group, for example, includes pellets that are 'light', a pellet is selected from a second group having a second material characteristic (step 952), where pellets in that group are 'heavy'. If that first group instead includes pellets that are 'heavy', a pellet is selected from a third group having a third material characteristic (step 953), where pellets in that group are 'light.' In either instance, the pellets are paired, or in other words one of each type of pellet is added to the thermal battery (step 960) such that the combination achieves a desired result. By way of example, assembling the thermal battery preferably comprises the steps of selecting one pellet that is less than the average individual pellet weight, thickness, or density, and selecting another pellet from a group of pellets having a greater than average individual pellet weight, thickness, or density. The selected pellets are added to the thermal battery (step 960).

In accordance with another aspect of an exemplary embodiment of the present invention, system 100 comprises a positive air pressure pellet transport device or similar pellet moving device, a device configured to sort pellets into groups of pellets based on a material characteristic of a type of pellet and to select from sorted groups of pellets to assemble a thermal battery. System 100 preferably further comprises a puck or similar device configured to hold a group of pellets having a common material characteristic, an ASRS or similar system for controlling the measuring, sorting, selecting, and stacking steps described in connection with pellet pairing and quality control. In one exemplary embodiment, the positive air pressure carrier is configured to automatically select individual pellets in a specific order based on material characteristics of the groups. Furthermore, a pellet pairing thermal battery assembly system may comprise any devices configured to facilitate increased power output, smaller batteries, and/or that tend to reduce the occurrence of "hot spots" by reducing the occurrence of several particularly thick, dense, or heavy pellets being stacked in proximity to each other.

In accordance with various aspects of an exemplary embodiment of the present invention, the thermal battery assembly system is configured to move individual pellets from one location to another. In accordance with other aspects, system 100 comprises a positive air pressure pellet carrier. In accordance with another aspect of an exemplary embodiment of the present invention, positive air pressure is used to lift, move, and set down a pellet. A positive air pressure pellet carrier, for example, is further configured to lift pellets of different weight, thickness, and/or density. The positive air pressure pellet carrier is able to lift and move the pellets due to the Bernoulli principle. The Bernoulli principle states that in fluid flow, an increase in velocity occurs simultaneously with a decrease in pressure.

In this regard, the positive air pressure pellet carrier preferably is configured to adjust the rate of airflow to facilitate lifting pellets that have different material properties, such as weight, thickness, density, and/or material. For example, a heavier pellet may be lifted using a greater rate of airflow compared to a lighter pellet that is lifted using a lower rate of air flow. In one example, the positive air pressure pellet carrier is configured to adjust the airflow rate each time a different type of pellet (e.g., cathode, anode, heat source, electrolyte) is selected. Furthermore, in an exemplary embodiment, the positive air pressure pellet carrier is configured to adjust the airflow rate for each pellet selected. For example, the positive air pressure pellet carrier preferably is configured to use a different air flow rate for one pellet than for another pellet of the same pellet type, where the two pellets have dissimilar weights. Furthermore, the positive air pressure pellet carrier preferably is configured to shake off a second, or partial, pellet that was inadvertently lifted with the intended pellet.

Although the device that moves the pellets is referred to herein as a positive air pressure pellet carrier, it should be understood that this term includes other devices that are configured to move pellets. The positive air pressure pellet carrier may be configured to move pellets from a first location to a QC station or to a reject bin. The positive air pressure pellet carrier is preferably configured to load pellets in a carrier device (e.g., a "puck") that is configured to facilitate transportation and/or storage of the pellet(s). The positive air pressure pellet carrier is further configured to unload a puck and to move pellets, one at a time, and stack them in a thermal battery assembly.

Figure 4:
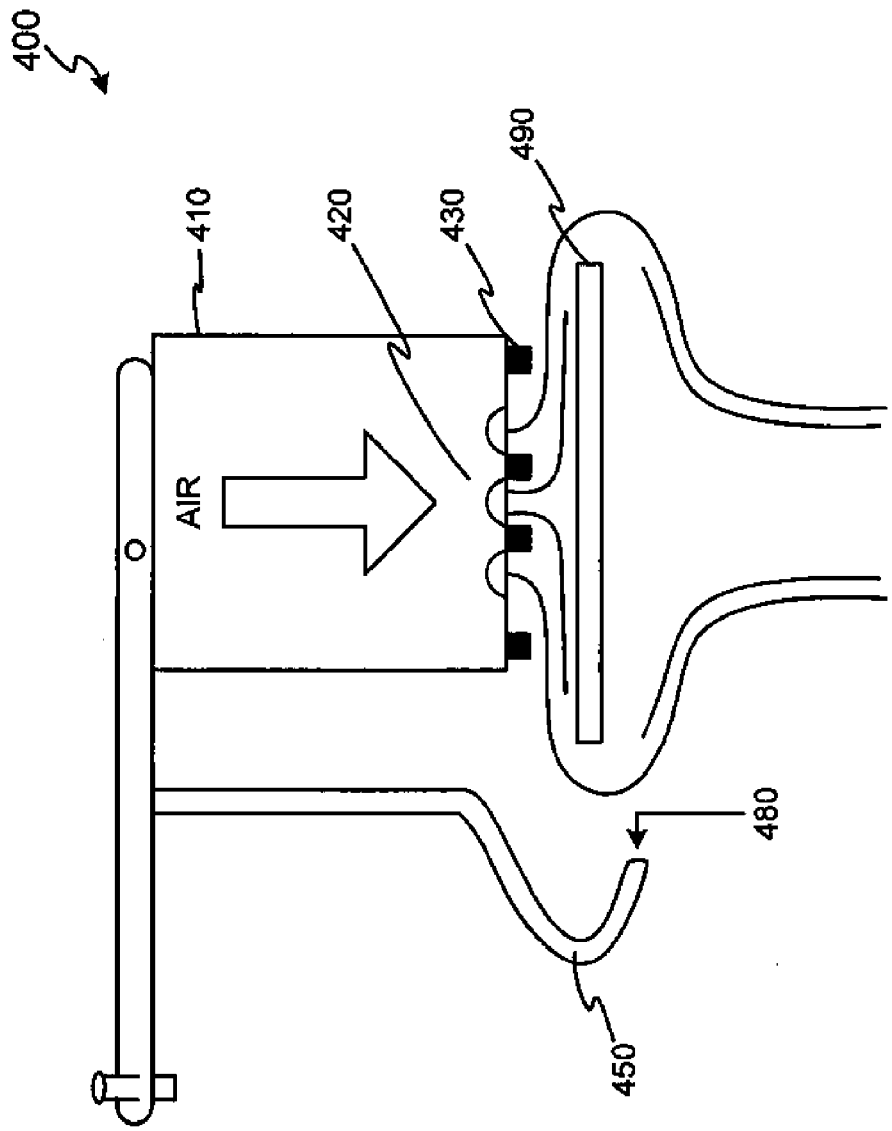
FIG. 4 illustrates an exemplary positive air pressure pellet moving device.

With reference now to FIG. 4, in accordance with one aspect of an exemplary embodiment of the present invention, the thermal battery manufacturing system comprises a positive air pressure pellet moving device 400 (e.g., a so-called Bernoulli gripper). Positive air pressure pellet moving device 400 comprises a head 410 having one or more air nozzles 420 directing air in a generally downward direction, one or more pads 430 on head 410 creating a distance between the nozzle(s) 420 and/or a lifted pellet (e.g., 490). Nozzles 420 may have an air flow rate of about 10 to about 3,000, preferably from about 10 to about 300, and optimally from about 20 to about 200. Positive air pressure pellet moving device 400 may have an air pressure of about 0.1 psig to about 120 psig, preferably from about 5 psig to about 70 psig, and optimally from about 10 psig to about 32 psig.

In accordance with one aspect of an exemplary embodiment of the present invention, positive air pressure pellet moving device 400 is preferably further configured to remove any additional pellets that might be lifted up by positive air pressure pellet moving device 400 with the intended pellet. Positive air pressure pellet moving device 400 may further be configured to adjust the pressure/air flow rate of the blast of air from its nozzle(s). For example, positive air pressure pellet moving device 400 may be less prone to double select heavier/denser pellets, and therefore may be configured to use lower pressure air blast for heavier pellets. Thus, positive air pressure pellet moving device 400 preferably is configured to change the air flow parameters for pellets having different material properties. In one exemplary embodiment, positive air pressure pellet moving device 400 is equipped with a proportional air valve that preferably is adjusted for each selected pellet or pellet type. However, device 400 may comprise any device that is configured to lift, move, and set down a pellet 490 using positive air pressure.

In one exemplary embodiment, positive air pressure pellet moving device 400 is configured to blow air in a direction perpendicular to and intersecting with the downward air flow of positive air pressure pellet moving device 400. The perpendicular air flow preferably is configured to blow below the selected (top) pellet. In an exemplary embodiment, the sideways blast preferably is configured to be provided at from about 25 to about 50 psig, however other pressure ranges may also be used. Furthermore, positive air pressure pellet moving device 400 may be configured to pulse either the parallel or perpendicular air flow to prevent or rectify selection of more than one pellet.

In accordance with one aspect of an exemplary embodiment of the present invention, positive air pressure pellet moving device 400 comprises an air knife 450. Air knife 450 may comprise one or more nozzles 480. Nozzles 480 are oriented to blow perpendicular to the main air flow and below a single selected pellet. Thus, air knife 450 preferably is connected to positive air pressure pellet moving device 400 in such a way that it moves in conjunction with positive air positive air pressure pellet moving device 400. Furthermore, in other embodiments, air knife 490 is not attached to positive air pressure pellet moving device 400. Furthermore, air knife 450 may include any device that may be used in conjunction with the positive air pressure pellet moving device 400 that is configured to remove 'double picks' and/or the like.

Thus, in accordance with one aspect of an exemplary embodiment of the present invention, the method further comprises the steps of: moving the head 410 of positive air pressure pellet moving device 400 over pellet 490, blowing air over the pellet, and while blowing, raising the head. The downward air stream may cause pellet 490 to rise up to pad(s) 430 on head 410 of Positive air pressure pellet moving device 400.

In accordance with yet another aspect of an exemplary embodiment of the present invention, a carrier/container device is configured to receive, move, and/or store one or more pellets. This carrier/container is also referred to herein as a "puck." The puck preferably is configured to hold and transport a plurality of pellets such that the integrity of the pellets is maintained (e.g., no chipping, breaking, degradation due to humidity and/or the like).

Figure 5:
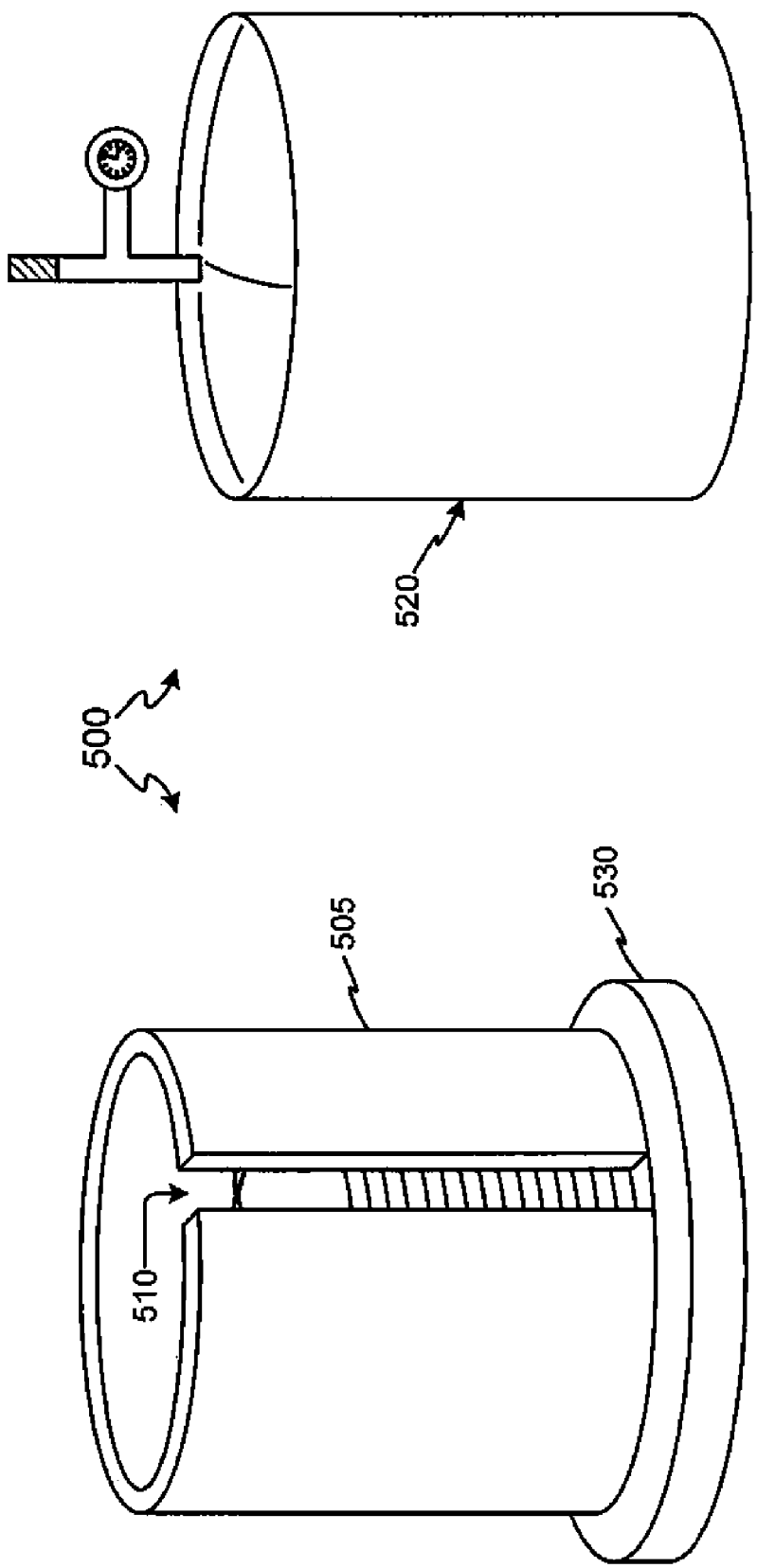
FIG. 5 illustrates an exemplary puck in perspective view.
Figure 6:
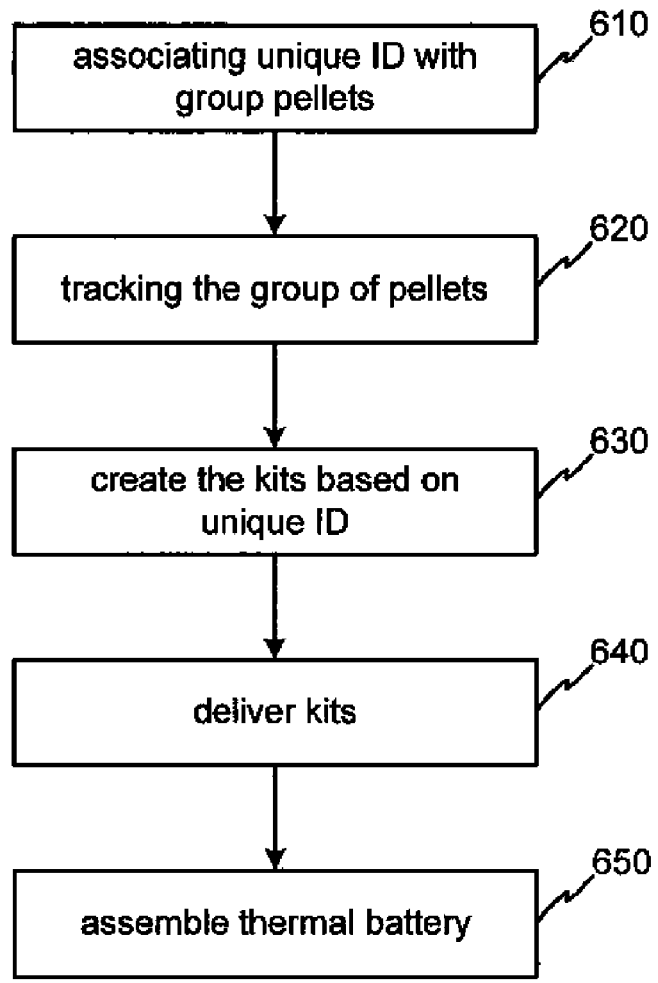
FIG. 6 is a flow diagram showing an exemplary automated storage and retrieval method within an exemplary thermal battery manufacturing method.

With reference to FIG. 5, in accordance with one aspect of an exemplary embodiment, puck 500 comprises a base 530 and a right circular cylinder 505. Cylinder 505, for example, is attached to and substantially perpendicular to base 530. Right circular cylinder 505 has an inner diameter at least as large as the diameter of a pellet to be contained therein. For example, the inner diameter preferably is 10% greater than the diameter of a pellet stored in the puck. In other examples, the inner diameter preferably is 7% or 5% greater than the diameter of a pellet stored in the puck. Right circular cylinder 505 may also have a height at least as great as the thickness of two or more pellets to be contained therein. In another example, the height is the thickness of approximately 20-40 such pellets. In another example, the height is from about 1 to about 10 inches, preferably from about 3 to about 7 inches, and optimally from about 4 to about 6 inches.

Furthermore, puck 500 preferably is any storage device that is configured to store and/or transport a group of pellets. Moreover, the diameter and height preferably are any values that facilitate loading and unloading the pellets using a positive air pressure pellet moving system such as a Bernoulli gripper.

In addition, with respect to facilitating use of Positive air pressure pellet moving device 400, puck 500 may further be configured to facilitate the selection of individual pellets and to reduce the likelihood of selecting multiple pellets ("double picking"). Puck 500 may also be configured to reduce pellet flutter and/or damage to the pellet.

In this regard, and in accordance with one aspect of an exemplary embodiment, puck 500 includes one or more slots 510. Slot 510, in one example, is oriented perpendicular to base 530. However, in other exemplary embodiments, slot 510 is at an angle to base 530, and/or is more or less continuous along the height of cylinder 505. Slot 510 may further have a width of from about ⅛ inch to about 2 inches, preferably from about ¼ inch to about 1 inch, or optimally from about ½ inch to about ¾ inch. In another example, slot 510 may have a width that is a function of the circumference of cylinder 505. For example, the width of slot 510 is about 1% to about 10% of the circumference of cylinder 505, preferably about 1% to about 5% of the circumference of cylinder 505, or optimally about 2 to about 4% of the circumference of cylinder 505.

Moreover, slot 510 preferably is any air passageway of a shape, size, width or configuration that allows air to pass between the area within the cylinder and the area external to the cylinder and to facilitate reduction of pellet damage, pellet flutter and/or pellet double picks.

In accordance with other exemplary aspects of the invention, puck 500 is configured to store a group of pellets in an environmentally isolated space. An "environmentally isolated space" is a volume or space that can be hermetically, thermally, barometrically, and/or otherwise isolated from adjoining volumes or spaces. Thus, puck 500 is configured to facilitate the storage of pellets and/or to tend to improve the shelf life of pellets stored therein. For example, puck 500 preferably is configured to store pellets under a vacuum in isolation from an external environment. Puck 500 may, for example, be configured to hold a vacuum from about −22 inches of mercury to about −29 inches of mercury. In another example, the vacuum preferably is from about −25 to about −29 inches of mercury or preferably from about −27 to about −29 inches of mercury. The pellets tend to be hygroscopic and moisture can be detrimental to the pellet's shelf life. Thus, storing the pucks in a vacuum (i.e., hermetically sealed) may tend to facilitate enhanced shelf life of the pellet components of a thermal battery. Shelf life may be defined in terms of the level of hermeticity. For example, the thermal battery may meet certain military standards such as Military-Standard-1234, known as the Mil-Std-883 test standard method for gross and fine leak. The present invention contemplates that the thermal battery is able to meet the Mil-Std-883 as it is currently and to meet it if it is revised by the military in the future.

Furthermore, the puck preferably is configured to facilitate protection of pellet inventory in the event of loss of environmental control over the area in which the pellets are created, processed, and/or stored. Pellets may be created, processed, and/or stored within a controlled environment, such as, for example, in an environment maintained at from about 68 to about 78 degrees Fahrenheit and less than about 1% relative humidity. However, if control is lost over that environment, the pellets sealed in puck 500 are likely to remain protected. Moreover, puck 500 preferably is configured to facilitate shipment of pellets from one manufacturing location to another, or within a manufacturing location passing through non controlled environments.

Thus, in accordance with one aspect of an exemplary embodiment, puck 500 further comprises a lid 520 that is configured to create a space within which pellets are stored and isolated from the surrounding environment. Lid 520 may for example, slide over the right circular cylinder 505 and seal against base 530. The seal may, for example be formed with an elastomeric O-ring. Lid 520 may further comprise a pressure gauge 550 and a valve 560. Valve 560 may, for example, be a Schroeder type valve (i.e., a standard bicycle tire valve).

Alternatively, valve 560 may comprise any other type of valve configured to facilitate drawing a vacuum on the sealed puck. Gauge 550 preferably is any gauge that is suitably configured to indicate the level of the vacuum drawn on puck 500, and the seal preferably is formed using any device(s) or techniques know for generating a vacuum tight seal between two objects.

In accordance with one aspect of an exemplary embodiment of the present invention, thermal battery manufacturing system 100 comprises an automatic stacker 120. The automated stacker preferably is configured to receive product, perform various quality checks on the product received, and facilitate assembly of the thermal battery by automatically stacking pellets.

Automatic stacker 120 is preferably configured to receive more than one type of pellet. In accordance with one exemplary embodiment, a group of pellets of one type may be delivered in a puck. Furthermore, automatic stacker 120 preferably is configured to receive a number of pucks. In this regard, one puck may contain pellets of a different type than another puck. In addition, automatic stacker 120 preferably is configured to receive a 'kit' comprising a plurality of pucks containing the types of pellets that are used to assemble a thermal battery.

In accordance with one aspect of an exemplary embodiment of the present invention, the kit may comprise a tray holding a plurality of pucks. Also, in an exemplary embodiment, the kit is delivered to automatic stacker 120 via a conveyor belt. However, any other systems and devices for delivering a plurality of pellets may be used to supply automatic stacker 120 with a source of pellets with which a thermal battery is assembled.

In accordance with another aspect of an exemplary embodiment of the present invention, automatic stacker 120 is also preferably configured to identify the kit and/or pucks that it receives and to off load pucks from the kit at the stacker station. For example, automatic stacker 120 preferably comprises a bar code reader. However, any other systems and devices for recognizing a plurality of pellets, for the purpose of selecting a pellet of a particular type for stacking, may be used.

Automatic stacker 120 (or an optional tracking, storage, and/or retrieval system denoted as an "ASRS" system and described below) may also be configured to unseal the pucks. In addition, automatic stacker 120 is configured to pick up pellets from the various pucks and automatically stack the pellets to form part of a thermal battery. In one exemplary embodiment, an automated stacker 120 is configured to select a first type of pellet from a first puck and a second type of pellet, different from the first type of pellet, from a second puck. In one exemplary embodiment, the pellets of the different types are stacked according to a predetermined sequence. By way of illustration only, automatic stacker 120 is configured to assemble one cell of a thermal battery by placing the following pellets on top of each other in the following order: a lithium anode pellet, an electrolyte pellet, a cathode pellet, a heat pellet, and an electrode pellet. Other stacking sequences, however, may be used. In accordance with various exemplary embodiments of the present invention, the sequence may be repeated a prescribed number of times. Furthermore, it is noted that exemplary pellet stack ups may vary from one section to another or within cells.

Thus, stacker 120 is preferably configured to select pellets from the various pucks based on the unique identifier and build a thermal battery based on pellets received in the kit. Furthermore, stacker 120 is preferably configured to automatically request the next kit of thermal battery components to be supplied by the ASRS. This request is preferably made via a kitting station. In accordance with another aspect of an exemplary embodiment of the present invention, automatic stacker 120 is further configured to facilitate pellet pairing as that term is described herein.

In accordance with another aspect of an exemplary embodiment of the present invention, automatic stacker 120 is configured to move pellets using positive air pressure using Positive air pressure pellet moving device 400 or a similar device. Automatic stacker 120 is configured, for example, to move pellets from a puck to one or more inspection stations, to discard stations, and/or to a stacking location where pellets are stacked to form part of the thermal battery. In addition, automatic stacker 120 is configured to operate under directions from an automated storage and retrieval system (described herein) or other similar methods of control, and under that direction to selectively pick from two or more carriers to create thermal battery cells.

In accordance with one aspect of an exemplary embodiment of the present invention, automated stacker 120 preferably is configured to perform various quality checks on the pellet. In an exemplary embodiment, automated stacker 120 is configured to perform a vision inspection of the pellet. Automated stacker 120 is preferably configured to determine whether two or more pellets were inadvertently picked up at the same time, or whether a selected pellet was dropped in transit. Also, automated stacker 120 is preferably configured: to verify that the pellet does not have a crack or other defect; to report errors; to stop the process, provide an alert, and await operator intervention; to discard a questionable pellet and select a replacement pellet; and/or the like. Moreover, the same quality checking is preferably performed on the replacement pellet. Furthermore, the quality checking may include checking the weight, thickness and/or density of the pellet.

In accordance with various aspects of an exemplary embodiment of the present invention, stacker 120 may comprise a system(s) such as a DVT LEGEND series camera, and/or the like. Moreover, automatic stacker 120 may comprise any devices or devices that can be configured to perform quality checking of the pellets before assembly in the thermal battery. In an exemplary embodiment, QC device 350 and the method discussed above is used to verify the quality of the pellets before they are assembled into the thermal battery.

Automatic stacker 120 may further comprise a stacking fixture. The stacking fixture is configured to align the pellets as they are stacked. Furthermore, the stacking fixture preferably is configured to be adjustable to accommodate pellets of different sizes (e.g., diameters.) Automatic stacker is preferably configured to reduce breakage in stacking pellets and/or reduce the distance the pellets are dropped.

Figure 7:
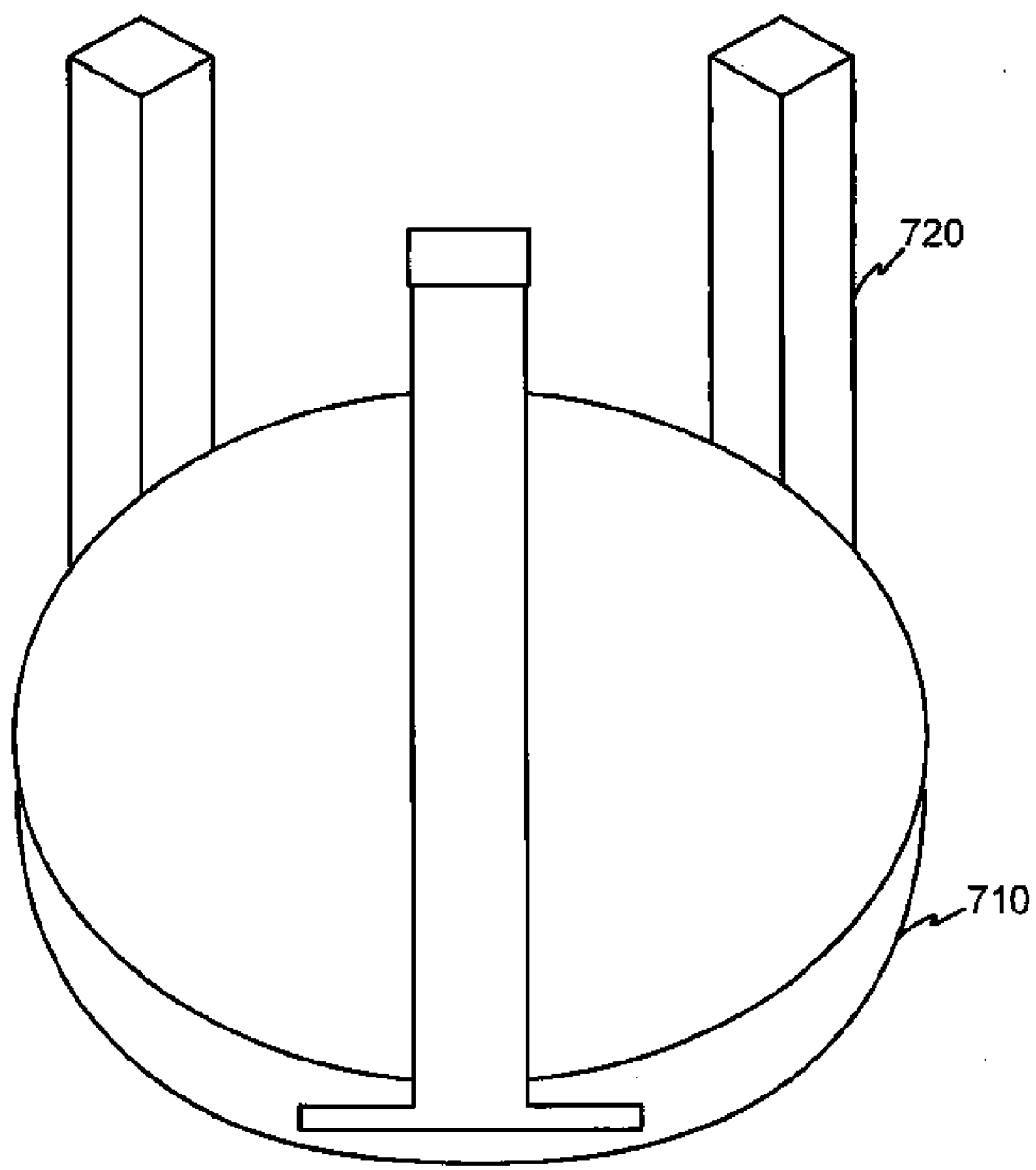
FIG. 7 illustrates a perspective view of an exemplary stacking assembly.

With reference to FIG. 7, an exemplary stacking fixture 700 may comprise a stacking plate 710 and at least three alignment bars 720. Alignment bars 720 are connectable to stacking plate 710. Furthermore, alignment bars 720 are preferably adjustably connected to stacking plate 710. The adjustment of alignment bars 720 may, for example, be in a radial direction from the center of stacking plate 710. Furthermore, stacking fixture 700 may comprise an elevator that lowers as pellets are stacked on the elevator, thus lowering the stack of pellets as the pellets begin to be placed on the thermal battery stacking assembly. This system is preferably controlled via program logic control ("PLC") and operates pneumatically, hydraulically or electronically.

However, stacking fixture 700 may comprise any device or combination of structures that are configured to stack pellets and to facilitate alignment of pellets during assembly of a thermal battery.

In accordance with one aspect of an exemplary embodiment of the present invention, the stacked pellets are wrapped (step 130). Wrapping the stacked pellets may facilitate enhanced structural integrity of the thermal battery, reduced breakage of the pellets, insulation of the thermal battery pellets, and electrical insulation.

The enclosing system preferably is configured to apply pressure to the stack of pellets through pneumatic, hydraulic, or servo drive, such that the pellets are pressed towards each other. Furthermore, this stack of pellets is wrapped with a tape. The system is preferably configured to wrap the stack of pellets with tape in a semi-automated manner. In one example, the stack of pellets is rotated and tape, from a spool, is wrapped around the stack of pellets as it spins. The system is further configured such that a user can move a spool of tape up and/or down as the tape winds about the stack of pellets, or this process may be automated. The system is configured such that the rate of rotation of the stack of pellets, pressure on the stack of pellets, and/or the tension on the tape being pulled onto the stack of pellets is controlled in an automated manner, which tends to reduce variations in the construction of the thermal battery.

Figure 8:
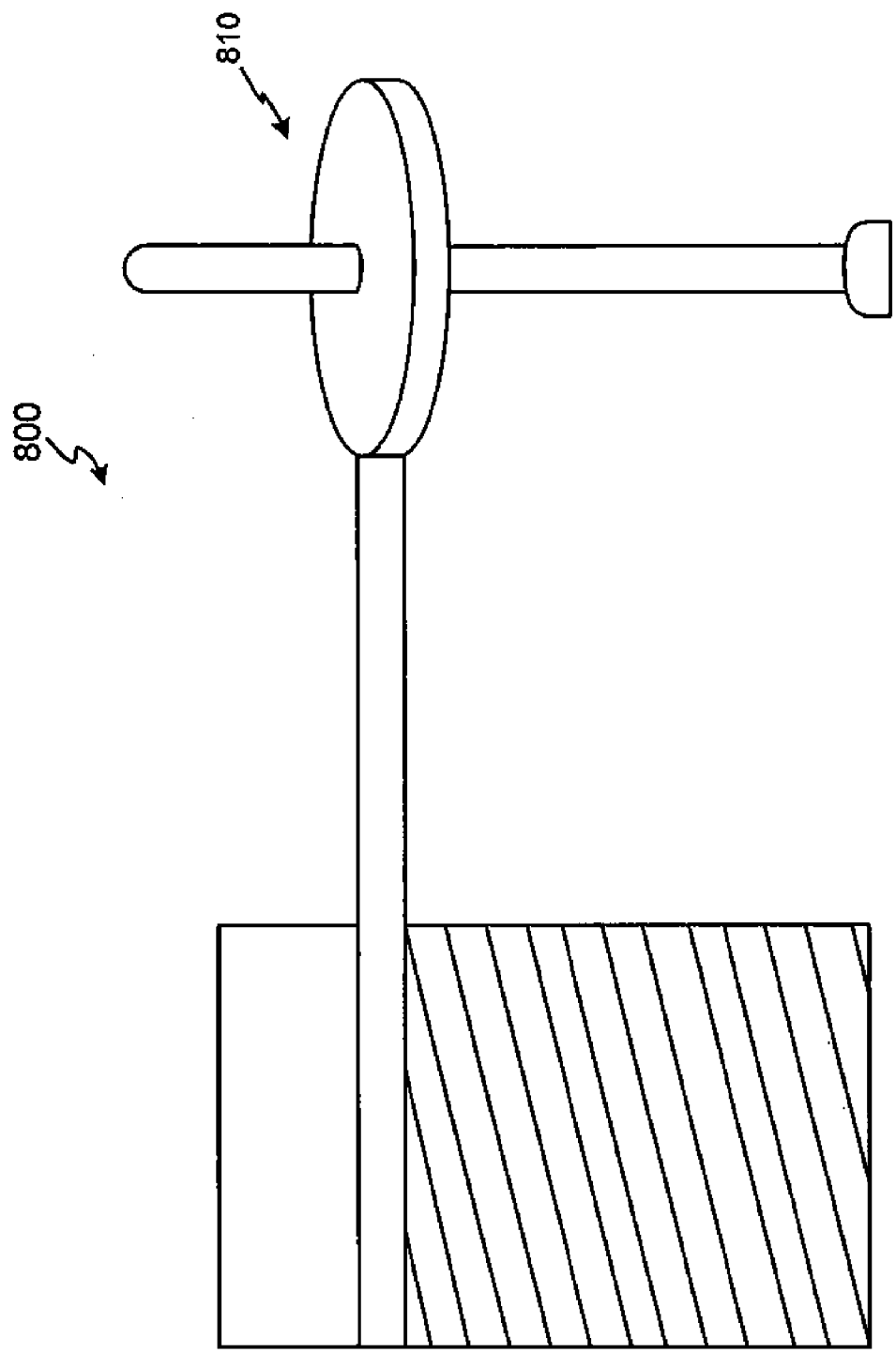
FIG. 8 illustrates an exemplary wrapping assembly.
Figure 9:
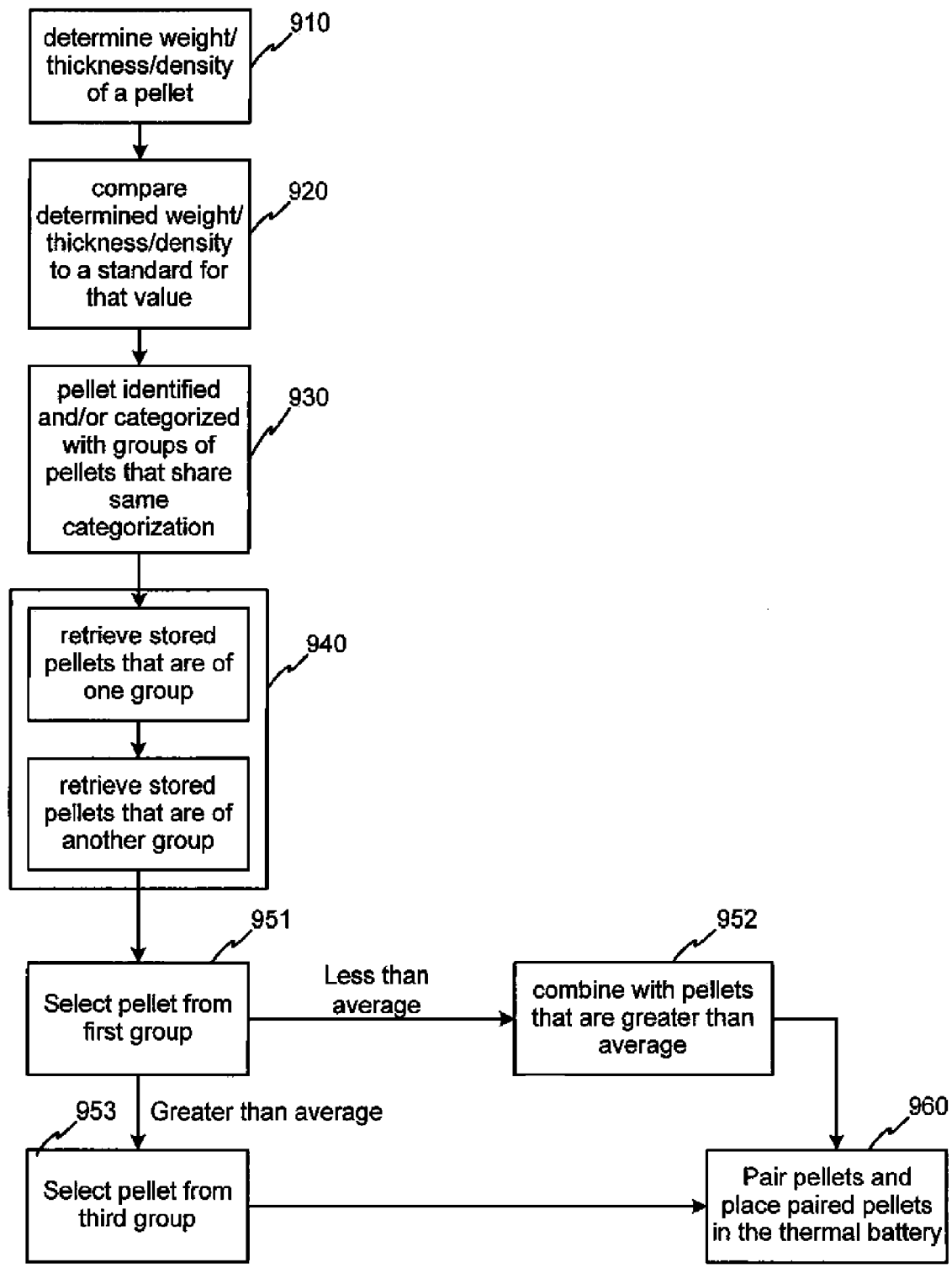
FIG. 9 is a block diagram of an exemplary method of pairing pellets.

In accordance with one aspect of an exemplary embodiment of the present invention, the tape may comprise a fiberglass tape that is preferably 0.005" thick by 0.50" wide. The tape is preferably covered by Roll A or Roll B weave of tape that meets certain military specifications such as MIL-Y-1140H. The tape may, however, be any tape that is configured to keep compression on the cell stack (pellets and insulation) to prevent component movement (e.g. pellets, leads, mica insulation, thermal insulation) during induced vibration of the finished battery. Furthermore, and with reference to FIG. 8, wrapper 800 preferably comprises a tape dispenser 810. Tape dispenser 810 may further comprise a pistol grip. Tape dispenser 810 may be physically attached to the pistol grip such that the two move up and down together. The pistol grip and tape dispenser 810 preferably are attached to an electromagnetic clutch that is automatically adjusted as the tape is wound onto the battery stack. The clutch is automatically adjusted as the tape spools runs down to maintain a set tension. The tension, may, for example, be maintained from about 2 ft-lb to about 80 ft-lb. In another example, the tension may be maintained from about 5 ft-lb to about 50 ft-lb or preferably from 5 ft-lb to about 25 ft-lb.

Wrapping the stack of pellets may further include the steps of insulating the tape wrapped stack of pellets, adding electrical tabs, and/or the like. Furthermore, electrical connections to the tabs preferably are spot welded using stainless steel leads. Other methods may also be used to form electrical connections between the segments of the thermal battery and the terminals at the top of the battery. Furthermore, any other suitable method of wrapping the stacked pellets may be used.

In accordance with another aspect of an exemplary embodiment of the present invention, the thermal battery manufacturing system is configured to seal the wrapped stack of pellets in a housing. In this regard, the wrapped stack of pellets preferably is placed inside a cylindrical container (or canister) and a header (or lid) is positioned on top of this container. The thermal battery manufacturing system may then be configured to weld the canister and the lid to each other in such a manner that the pellet stack is hermetically sealed within the canister.

Figure 10:
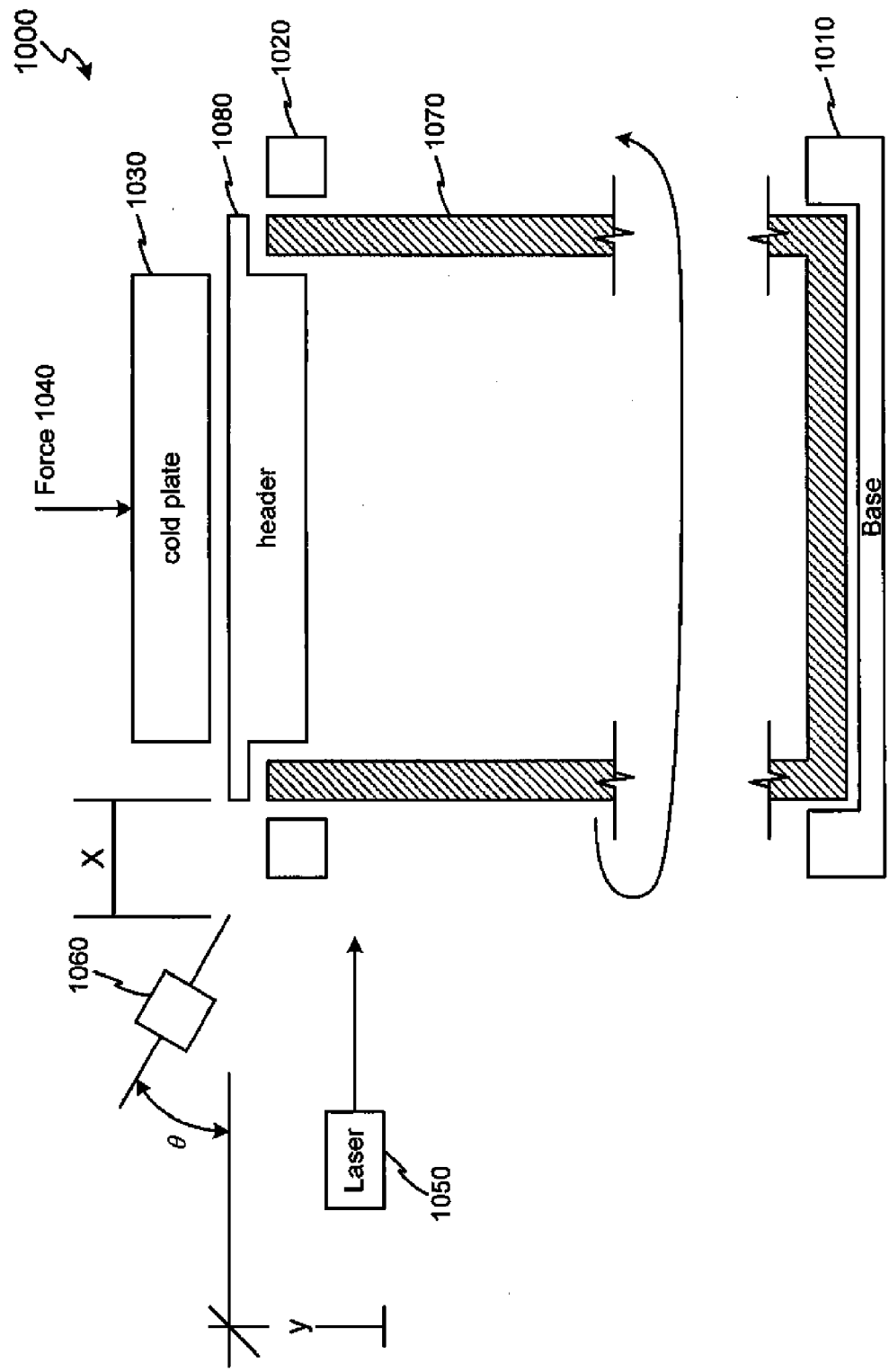
FIG. 10 illustrates a block diagram of an exemplary automated sealing system.

In accordance with yet another aspect of an exemplary embodiment of the present invention, and with reference to FIG. 10, thermal battery manufacturing system 100 may comprise an automated sealing system 1000. Automated sealing system 1000 may comprise a base 1010, a collar 1020, and a heat sink comprising a cold plate 1030, a hold 1040, a laser 1050 and a weld torch 1060. For clarity, a container 1070 and a header 1080 are illustrated in relation to automated sealing system 1000.

In accordance with another aspect of an exemplary embodiment of the present invention, automated sealing system 1000 is preferably configured to draw heat away from the header/container during the welding operation. For example, automated sealing system 1000 is preferably configured to draw heat from the top of the header and from the sides of the container. In addition, system 1000 is optimally configured to provide structural support that tends to inhibit changes in the shape of the container during the welding process. In this manner, automated sealing system 1000 is also configured to tend to reduce the possibility of cracking the glass seal in the header.

The heat sink comprising cold plate 1030 may further comprise collar 1020. Collar 1020 preferably comprises two metal pieces that are configured to be placed around container 1060 in the vicinity of the joint between the header and container. Collar 1020 may further be configured to touch the container around the majority of its circumference. Collar 1020 may further be configured such that an overlapping clamp configuration tends to reduce the chance of heat build up at gaps between the two collar pieces. Thus, collar 1020 is configured to help maintain concentricity and to draw the heat away from the location being welded.

Both cold plate 1030 and collar 1020 preferably are chilled before use, for example, by resting on a cold plate. Cold plate 1030 and/or collar 1020 may be placed in contact with the thermal battery just prior to the welding step, and removed thereafter. In one example, collar 1020 may comprise two components that are hinged together at one side and held together by a thumbscrew and pin apparatus at the opposite side. The two collar pieces may further include over-lapping portions where they meet.

Nevertheless, the heat sink may comprise any other devices and systems that are configured to remove heat from the location being welded. Furthermore, the heat sink may be any device that provides structural support in the vicinity of the welding.

In accordance with another aspect of an exemplary embodiment of the present invention, automated sealing system 1000 is preferably configured to press header 1080 towards container 1070 and to weld the header to the container. Hold 1040 preferably is configured to be positioned over header 1060 and to facilitate applying pressure on the container/header assembly. System 1000 preferably is configured to create the force that presses hold 1040 into header 1080, which in turn is pressed into container 1070. System 1000 preferably is configured to create this pressure through hydraulic or electronic means with a pressure of about 50 ft-lb. to about 5000 ft-lb., preferably about 100 ft-lb. to about 3000 ft-lb., and optimally of about 100 ft-lb. to about 2500 ft-lb. In another example, system 1000 comprises a quality control device that is configured to regulate the distance hold 940 moves. For example, program logic control preferably is configured to control the force and relative movement of the press. The program logic control, for example, is configured to receive feedback from a series of quality control devices regarding the force and movement of the press and to base its control in part on that feedback. Thus, automated sealing system 1000 preferably is configured to use force and distance control on the header/container compression. In this manner, automated sealing system 1000 is configured to avoid over or under pressing the header and deforming the assembly.

Thus, in accordance with another aspect of an exemplary embodiment of the present invention, automated sealing system 1000 comprises a press. The press may comprise a hydraulic press such as, for example, an Enerpac cylinder-type RD46, or a servo press such as, for example, an Allen Bradley motor, series 7054. Furthermore, other devices for pressing the two portions together during welding may be used. In addition, by way of example, the canister and lid are made of stainless steel. However, other materials may also be used for the outer casing of a thermal battery.

Furthermore, automated sealing system 1000 is preferably configured to rotate the compressed header/container assembly as the junction between the two pieces is welded. Base 1010 preferably is configured to hold and revolve the container.

In another exemplary embodiment, automated sealing system 1000 is configured to use laser 1050 to detect changes in the distance X between weld torch 1060 and the seam being welded. Based on this detected change in distance, system 1000 preferably is configured to make an adjustment to compensate for this change in distance. For example, laser 1050 is preferably configured to measure the distance between the laser and the container side. If a container has a minor deviation from a true circular cylinder, as base 1010 rotates the header/container assembly, the distance between laser 1050 and the circumference of the container will change. Laser 1050 is configured to detect such a distance change and automated sealing system 1000 is configured to move weld torch 1060 in or out based on the detected distance changes. In this manner, automated sealing system 1000 is configured such that any irregularities or non-concentricity in the container/header seam are not as likely to affect the distance between weld torch 1060 and the seam.

Thus, in accordance with yet another aspect of an exemplary embodiment of the present invention, automated sealing system 1000 comprises a laser guided weld torch 1060. In one exemplary method, weld torch 1060 is positioned at the seam, and backed off a distance X from the container. Furthermore, weld torch 1060 preferably is positioned at an angle theta from perpendicular to the container side. By way of example, distance X preferably is about 0.020" to about 0.100", preferably about 0.030" to about 0.080", and optimally about 0.040" to about 0.060". Also, angle theta preferably is about 10° to about 80°, preferably about 30° to about 60°, and optimally about 40° to about 50°.

Furthermore, laser 1050 preferably comprises a sensor that is configured to communicate with the PLC; in turn the PLC adjusts the position of the weld nozzle with respect to the weld seam of the container and header. The sensor is preferably an Optoelectronic sensor.

Additionally, automated sealing system 1000 may comprise servo actuators. The actuators are attached to weld torch 1060. However, the actuators may comprise hydraulic actuators or any other actuators that are configured to move weld torch 1060. Furthermore, any system may be used that is configured to use a laser to guide a weld torch about the perimeter (whether circular or otherwise) of a container, wherein the weld torch position can be adjusted to maintain a constant distance X between weld torch 1060 and the container/header joint.

Automatic sealing system 1000 preferably is further configured to maintain other parameters constant. For example, the rotation of the container/header assembly preferably is configured to be at a constant speed. For example, the rotation speed is about 0.001"/sec to about 2.000"/sec, preferably about 0.010"/sec to about 0.750"/sec, and optimally about 0.010"/sec to about 0.250"/sec. Automatic sealing system 1000 may also be configured to maintain a constant pulse rate, and/or the temperature. Furthermore, automated sealing system 1000 preferably is configured to adjust such parameters to account for variations in other parameters.

A typical prior art thermal battery had a 75% to 90% chance of passing the gross and fine leak tests the first time they were tested. Although various standards are established for 'passing', in one exemplary standard, a thermal battery that holds a vacuum down to 1.times.10-7 cc/atm is a passing thermal battery and will have a shelf life of approximately twenty years. In accordance with another aspect of an exemplary embodiment of the present invention, a product's specification defines the passing criteria for fine leak. Any leak greater than the specified value is determined to be a 'leak failure.' Passing standards and testing techniques are further defined in Mil-Std-883, method 1014, gross leak and fine leak testing.

In accordance with an aspect of an exemplary embodiment of the present invention, the automated welding process is configured to facilitate improving the first pass rate from about 85% to about 98% or higher. Thus, an exemplary thermal battery produced by the automated sealing process of thermal battery manufacturing system 100 has at least a 98% chance of passing the gross and fine leak tests. This represents a substantial improvement over the prior art in the pass rate of a thermal battery. Thus, a thermal battery manufactured with the sealing system described herein is a new thermal battery having the property of being 98% likely to pass a hermeticity test. Furthermore, the thermal battery preferably has the property of having an aesthetically pleading weld. Moreover, the speed of welding may be improved by 30% over conventional welding in thermal battery construction.

In accordance with exemplary embodiments of the present invention, the thermal battery manufacturing system is configured to perform one or more tests on the thermal battery (step 240). Thermal battery testing preferably is configured to verify the hermetic seal, confirm that there are no shorts or opens, verify the integrity of all connections, verify that dimensional tolerances are satisfied, and/or detect any deviations from specifications.

The testing comprises non-destructive or destructive testing. Exemplary non-destructive testing may include: a hermetic seal test, an x-ray test, a capacitance/inductance test, a resistance test, a squib resistance test, an insulation resistance test, a polarity test, and/or the like. Non-destructive testing may further include dimensional testing to verify that the size, length, and relational dimensions are correct.

The hermetic seal test may comprise a gross leak test and/or a fine leak test. The gross leak test, for example, may comprise the steps of placing the thermal battery in a chamber and purging the chamber with helium for thirty minutes, then placing the thermal battery in a hot water bath. In this exemplary gross leak test, visible bubbles may indicate an ineffective seal.

The fine leak test, for example, may comprise the steps of placing the thermal battery in a chamber and purging the chamber with helium for thirty minutes, then after removing the external helium source, a 'sniff' test is performed. Detection of helium by the "sniff" test may indicate an ineffective seal. The "sniff" test may be useful for detecting relatively small leaks. An ineffective seal often is detrimental to shelf life. Furthermore, testing (step 240) comprises any method for verifying that the thermal battery is sealed to within the standards specified for that particular thermal battery.

In accordance with an exemplary embodiment of the present invention, the thermal battery is tested through non-destructive x-raying of the thermal battery. In addition, other X-ray testing methods and devices may be used to facilitate performing a quality check on a thermal battery.

In accordance with another aspect of an exemplary embodiment, the testing (step 240) may further comprise capacitance testing. Capacitance testing preferably is configured to distinguish between "in family" and "out of family" thermal batteries. An "in family" battery is a thermal battery that satisfies standards and/or specifications for that type of thermal battery. Furthermore, "in family" thermal batteries of the same type will generally have similar capacitance test results when tested under the same conditions. In contrast, an "out of family" thermal battery may have substantially different test results from "in family" thermal batteries, even when tested under the same conditions. An "out of family" thermal battery preferably is a thermal battery that is outside of quality control standards and/or specifications.

Briefly, capacitance testing may comprise one or more of the following steps: connecting the thermal battery in series with a resistance; connecting the thermal battery and resistance in series with a sinusoidal voltage source; applying a sinusoidal voltage to the thermal battery, measuring an impedance across two terminals of the thermal battery, comparing the measured impedance to a reference impedance; and indicating whether the tested thermal battery is "in family" or "out of family." For further information regarding capacitance/inductance testing, see U.S. patent application Ser. No. 11/162,061 (filed on Aug. 26, 2005), which is incorporated herein in its entirety by reference. Although described herein as capacitance testing, inductance or reactance measurements may also be suitably used in this test. Thus, testing (step 240) may comprise any test that uses capacitance, inductance, or reactance measurements to distinguish between "in-family" and "out of family" thermal batteries.

In accordance with another aspect of an exemplary embodiment, the testing (step 240) may comprise resistance testing. A resistance test may be configured to verify that there are no shorting paths. For example, in a Squib resistance test (e.g., 0.9-1.9 Ohms) a relatively small voltage (0.25 V) at a very low current (approximately 1 mA) is placed across the thermal battery squib terminals, and the resistance of the squib is analyzed. In this test, the Amps across the thermal battery squib terminals are not large enough to fire the battery, but may indicate whether a short exists. Similarly, an insulation resistance test may be configured to verify that there are no shorting paths. This test measures the resistance from pin to case (100 Mohms) when 500 VDC is applied and pin to pin (1 Mohms) when 250 VDC is applied.

Testing (step 240) may further comprise a polarity test. Testing may also comprise dimensional tests, or in other words, verifying that various components of a thermal battery are within specified ranges for size, length, relative distances, and/or the like. In this regard, distances are measured to verify that the thermal battery's dimensions are within specified tolerances. Moreover, testing (step 240) may comprise destructive tests, where the battery is fired and the output and other characteristics of the battery are recorded.

Thus, testing (step 240) may comprise any testing that is configured to identify thermal batteries that are or are not within specifications, tolerances, and/or QC standards. Furthermore, the results of one or more tests preferably are captured, stored, and analyzed. These results preferably are captured using any standard data acquisition or manual input method. These results may also be stored using a database or other similar system for storing/analyzing data.

In accordance with one aspect of an exemplary embodiment of the present invention, system 100 comprises a tracking, storage, and/or retrieval system ("ASRS") 150.

ASRS 150 preferably is configured to track pellets as they move through the thermal battery manufacturing process. Furthermore, ASRS 150 preferably is configured to facilitate automatically retrieving pellets from storage and/or making kits for facilitating construction of a thermal battery. Moreover, ASRS 150 may be configured to facilitate improved data collection and analysis regarding the thermal battery manufacturing process.

In accordance with one aspect of an exemplary embodiment of the present invention, a group of pellets are associated with a unique identifier. For example, puck 500 preferably is associated with a unique identifier. The unique identifier may be a bar code, a number, a color, and/or the like. The unique identifier is configured to be associated with data that is relevant to thermal batteries and/or the thermal battery manufacturing process.

The unique identifier preferably is associated with the puck by, for example placing a sticker with the bar code on puck 500, etching a bar code on puck 500, and/or the like. In other embodiments, a radio frequency (RF) device is attached to puck 500 for communicating the identifier via RF signals. Furthermore, other methods of identifying an object may be used.

ASRS 150 is also preferably configured to track, based on one or more unique identifiers, the location of the group of pellets. In accordance with another aspect of an exemplary embodiment of the present invention, ASRS 150 is configured to facilitate inventory management with respect to the pellets used in assembling a thermal battery. For example, ASRS may keep track of the number of pucks that are available for use in kits, the number of pucks that are being prepared at that time, and the number of requests for thermal batteries. ASRS may further use predictive analysis or other input to determine future needs.

Moreover, ASRS 150 preferably is configured to control press system 110 to cause press system 110 to create the types of pellets that ASRS 150 has determined are in highest demand. ASRS may thus, order pellets in a puck, and then store those pucks for piecing together a kit with the correct number of pellets of the correct type. Moreover, in an exemplary embodiment, ASRS 150 is configured to facilitate ordering materials used to create the pellets.

Although described herein as a storage and retrieval system, wherein pellets are created and stored in lots, and retrieved when called upon for construction of thermal batteries, in other embodiments, the automated storage and retrieval system is configured to cause pellets to be created on demand and delivered to the automatic stacker directly. In further exemplary embodiments, the automated storage and retrieval system not only requests and/or confirms the delivery of material to the designated points in the process, but it may control the delivery of the parts.

In accordance with an aspect of an exemplary embodiment of the present invention, ASRS 150 is configured to automatically request the thermal battery components from storage. Stated another way, ASRS 150 is configured to automatically request pucks that hold the specific pellet types. ASRS 150 is preferably configured to deliver those pucks to the stacker in an automated manner. However, some or all of the products may be moved manually.

In another exemplary embodiment, the ASRS is configured to receive information identifying desired features or qualities of a thermal battery. For example, a user may input a thermal battery model number into the ASRS system. The ASRS preferably is configured to process such information and create instructions for making such a battery. The instructions may, for example, be delivered to operators in any suitable format, e.g., printed, digitally, and/or the like.

Also, the ASRS preferably is configured to provide instructions to the automatic stacking, wrapping, and testing systems to facilitate the packaging of the components. Moreover, the ASRS system preferably is configured to control one or more of these systems without human intervention or with minimal human intervention.

In accordance with one aspect of an exemplary embodiment of the present invention, ASRS 150 comprises a computer, a database, a puck storage location, and/or a device for recognizing the identity of the carriers, for example, ASRS may comprise a bar code scanner. However, other electronic devices may be used to receive and process tracking data such as the serial number and other information. ASRS 150 also preferably comprises robotic product movers, conveyor belts, and/or the like. However, other devices may be used for moving carriers of products from one location to another and for selectively routing those carriers.

In accordance with another aspect of an exemplary embodiment of the present invention, ASRS 150 is configured to receive data from various systems and/or devices in thermal battery manufacturing system 100. This data preferably is related to the unique identifier and preferably is stored in a database associated with ASRS 150. The data preferably is received from press system 110, from various quality control systems, from stacker 120, and from wrapper 130.

Preferably, the unique identifier identifies a particular puck containing pellets of a particular type. Thus, the data may specify the contents of the puck, the number and type of pellets in the puck, the average weight, density, and/or thickness of the pellets, information regarding the composition of the pellets, the materials from which the pellets in that puck were made, the environmental conditions at the time of manufacture of those pellets, the number of pellets discarded from a particular run of pellets, the individual weights, thicknesses, and/or densities of the pellets, and/or the like. Furthermore, ASRS 150 is configured to track the movement of the puck from one location to another based on the unique identifier.

In one exemplary embodiment, the data tracking, inventory, material retrieval and storage, and data analysis preferably is facilitated using an electronic data package such as a PLEXUS data package. However, other data packages and inventory management software may also be used to track inventory and associated data.

In accordance with an aspect of an exemplary embodiment of the present invention, method 200 is configured to track components, subcomponents, end products and/or "properties" of those products. Tracking may, for example, involve the steps of automatically storing and retrieving components, subcomponents and/or end products and associated data (step 250).

In accordance with one aspect of an exemplary embodiment of the present invention, a method 600 for improving the reject rate of thermal batteries may comprise the steps of associating a unique identifier with a group of pellets (step 610), tracking the group of pellets (step 620), creating kits (comprising groups of pellets) based on the unique identifier (step 630), and delivering the kits to a stacker that assembles a thermal battery from the kits (steps 640 and 650). The method may further include the step of recording information associated with the group of pellets.

The group of pellets may, for example, all share a common characteristic. For example, the pellets may all be anode pellets, the anode pellets may all be in the heavy category, and/or the like. Some of these pellets may be grouped in a puck. In one embodiment, the step of associating a unique identifier with a puck (step 610) may include the step of labeling a puck with a bar code.

Furthermore, the step of creating a kit (step 630) comprises the steps of selecting from among a plurality of pucks two or more pucks to form a kit. The kit may, for example, contain an anode puck, a cathode puck, an electrolyte puck, and a pyrotechnic puck. In accordance with one aspect of an exemplary embodiment of the present invention, the number of pucks and the type of material in each selected puck is based on a recipe for making a particular thermal battery. Thus, the step of creating a kit further includes the step of selecting a puck for a particular recipe based on the number of pellets in each puck and/or material characteristics of the pellets in that puck. The kit preferably comprises some or all of the pellet components that are used to build an identified thermal battery.

In accordance with one aspect of an exemplary embodiment of the invention, the kitting system is configured to facilitate automatic delivery of battery construction materials to the stackers, for example by assembling a "kit" of pucks. The kitting system (or kitting "station") may be configured to communicate with both the stackers and the ASRS. The stacker, in accordance with one exemplary embodiment, is configured to request one or more kits of the kitting station. For example, when a stacker has completed the assembly of a battery stack it requests that another kit of pucks be delivered. In one exemplary embodiment, the kitting station receives this request from the stacker and communicates a request to the ASRS to provide pucks containing specific types of pellets for the specific battery or batteries that will be assembled by the stacker.

The ASRS is configured to provide requested pucks to the kitting system. In one exemplary embodiment, the pucks that are included in the kit are selected to provide the types of pellets used to produce a single type of battery. In one exemplary embodiment, the ASRS is configured to automatically transport pucks to the kitting station via a conveyor system. In another exemplary embodiment, the kitting station assembles the pucks onto a pallet and releases the pallet to be delivered to the stacking station, where the stacking station unloads the pucks from the pallet.

The kitting station may also facilitate return from the stacker of a used pallet of pucks. In one exemplary embodiment, the kitting station is configured to receive a pallet from the stacker and automatically remove empty or partially empty pucks from the pallet for reuse. The pallet is then available for the next kit to be assembled. The kiting station may be configured to use a pneumatic or electronically actuated mechanical gripper. The kitting station is configured to read the unique identifier on each puck, for example, with a bar code scanner, to identify the puck and/or its contents. Identification of the puck and/or its contents facilitates loading and/or unloading specific pucks and placement of specific pucks in desired locations on or off of the pallet.

Thus, ASRS 150 is preferably configured to automatically assemble the kit based on input identifying the particular thermal battery to be built and/or to deliver the kit to an assembly station.

The invention may be described herein in terms of functional block components, optional selections and/or various processing steps. It should be appreciated that such functional blocks may be realized by any number of hardware and/or software components suitably configured to perform the specified functions. For example, the invention may employ various integrated circuit components, e.g., memory elements, processing elements, logic elements, look-up tables, and/or the like, which may carry out a variety of functions under the control of one or more microprocessors or other control devices. Similarly, the software elements of the invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the invention may employ any number of conventional techniques for data transmission, messaging, data processing, network control, and/or the like.

It should be appreciated that the particular implementations shown and described herein are illustrative of the invention and its best mode and are not intended to otherwise limit the scope of the invention in any way. Indeed, for the sake of brevity, conventional data networking, application development and other functional aspects of the systems (and components of the individual operating components of the systems) may not be described in detail herein. It should be noted that many alternative or additional functional relationships or physical connections might be present in a practical thermal battery manufacturing system.

As may be appreciated by one of ordinary skill in the art, the invention may take the form of an entirely software embodiment, an entirely hardware embodiment, or an embodiment combining aspects of both software and hardware or other physical devices. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may also be stored in a computer-readable memory that may direct a computer or other programmable data processing apparatus to function in a particular manner, such that the instructions stored in the computer-readable memory produce an article of manufacture including instruction means which implement functions of flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

In the foregoing specification, the invention has been described with reference to specific embodiments. However, it may be appreciated that various modifications and changes may be made without departing from the scope of the invention. The specification and figures are to be regarded in an illustrative manner, rather than a restrictive one, and all such modifications are intended to be included within the scope of invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A system to produce a thermal battery, comprising:
   a press system comprising a rail and shoe system to form pellets from a powder material;
   a stacking system associated with the press system, the stacking system configured to select pellets from a plurality of storage containers and to stack the selected pellets in a predetermined order via a positive air pressure pellet carrier device; and
   an enclosing system associated with the stacking system, wherein the enclosing system is configured to hermetically enclose the stacked pellets, and wherein at least one of the press system, the stacking system, and the enclosing system is substantially automated.

2. The system of claim 1, wherein the press system comprises a servo press.

3. The system of claim 1, wherein the powder material comprises:
   one of a lithium/aluminum compound and a lithium/silicon compound suitable for forming an anode pellet.

4. The system of claim 1, wherein the powder material comprises:
   an iron disulfide or cobalt disulfide compound suitable for forming a cathode pellet.

5. The system of claim 1, wherein the storage container is a puck and wherein the press system is configured to sort pellets into more than two pucks such that each puck comprises pellets of substantially the same material and pellets that substantially share at least one of the following characteristics: weight, density, and thickness.

6. The system of claim 1, wherein the stacking system is configured to select appropriate pellets for forming a thermal battery, and to stack the selected pellets on a stacking fixture; wherein the pellets are selected based on at least one of weight, thickness, material, and density of the selected pellet.

7. The system of claim 1, wherein the stacking system is configured to select and stack in a pre-determined order a plurality of pellets, wherein at least two pellets of the plurality of pellets comprise substantially different materials.

8. The system of claim 1, wherein the enclosing system is configured to weld a seam between a thermal battery container and a thermal battery cap when pressed together, the enclosing system further comprising a laser and a weld torch; wherein the weld torch is configured to seal the puck base to the puck cap in an automated manner, wherein the laser is configured to facilitate adjusting the position of the weld torch to maintain a constant distance between the weld torch and the seam.

9. The system of claim 1, further comprising:
   an inventory system coupled to at least one of the press system, the stacker system, and the enclosing system to at least one of track, store, and retrieve the pellets while the pellets are located in at least one of the press system, the stacker system, and the enclosing system.

10. The system of claim 1, wherein at least one of the press system and the stacking system comprises a positive air pressure pellet carrier device configured to utilize the Bernoulli principle to lift a selected pellet.

11. The system of claim 10, wherein the positive air pressure pellet carrier device further comprises an air knife configured to remove one or more non-selected pellets that have been lifted by the positive air pressure pellet carrier device.

* * * * *